United States Patent [19]

Bareket

[11] Patent Number: 4,583,855
[45] Date of Patent: Apr. 22, 1986

[54] OPTICAL PHASE MEASURING APPARATUS

[75] Inventor: Noah Bareket, San Jose, Calif.

[73] Assignee: Lockheed Missiles & Space Company, Inc., Sunnyvale, Calif.

[21] Appl. No.: 581,185

[22] Filed: Feb. 17, 1984

[51] Int. Cl.$^4$ .................................................. G01J 9/02
[52] U.S. Cl. ........................................ 356/351; 356/359
[58] Field of Search ......................... 356/351, 359, 360

[56] References Cited

FOREIGN PATENT DOCUMENTS

| 2111936 | 9/1980 | Fed. Rep. of Germany | 356/360 |
|---|---|---|---|
| 2375577 | 7/1978 | France | 356/351 |
| 160165 | 5/1983 | German Democratic Rep. | 356/351 |
| 2012450 | 7/1979 | United Kingdom | 356/351 |

OTHER PUBLICATIONS

"Instantaneous Phase–Measuring Interferometry: Principles and Recent Advances Reported", *Laser Focus/Electro-Optics*, pp. 66–70, Oct. 1983.

Smythe et al., "Instantaneous Phase Measuring Interferometry", *Proc. SPIE*, vol. 429, pp. 16–21, 8/83.

*Primary Examiner*—Vincent P. McGraw
*Assistant Examiner*—Matthew W. Koren
*Attorney, Agent, or Firm*—John J. Morrissey

[57] ABSTRACT

An apparatus is described for measuring spatial phase difference between a signal beam and a reference beam in substantially real time, where the signal and reference beams are coherent beams of optical radiation superimposed upon each other and having orthogonal polarization states with respect to each other.

12 Claims, 3 Drawing Figures

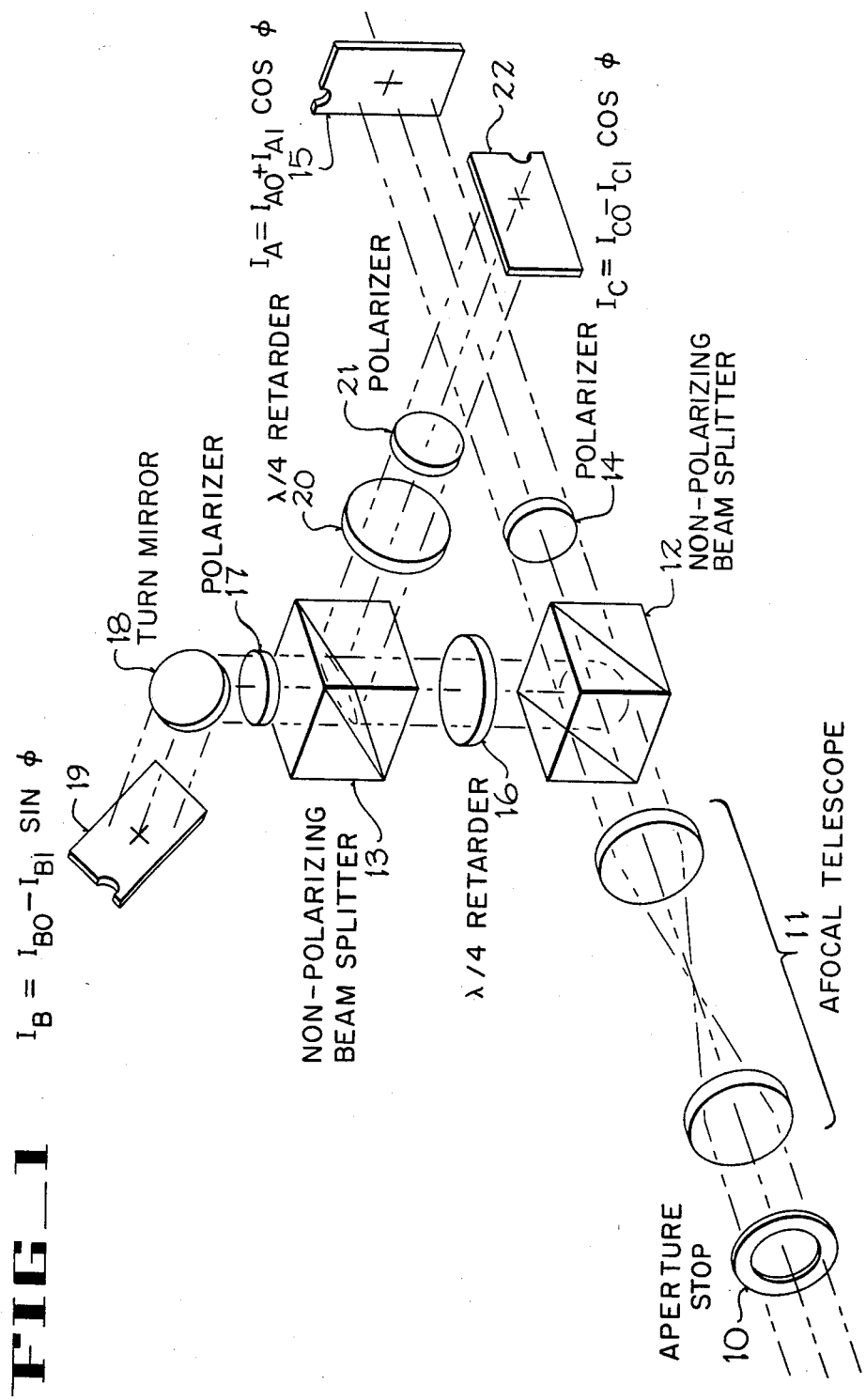
FIG_1

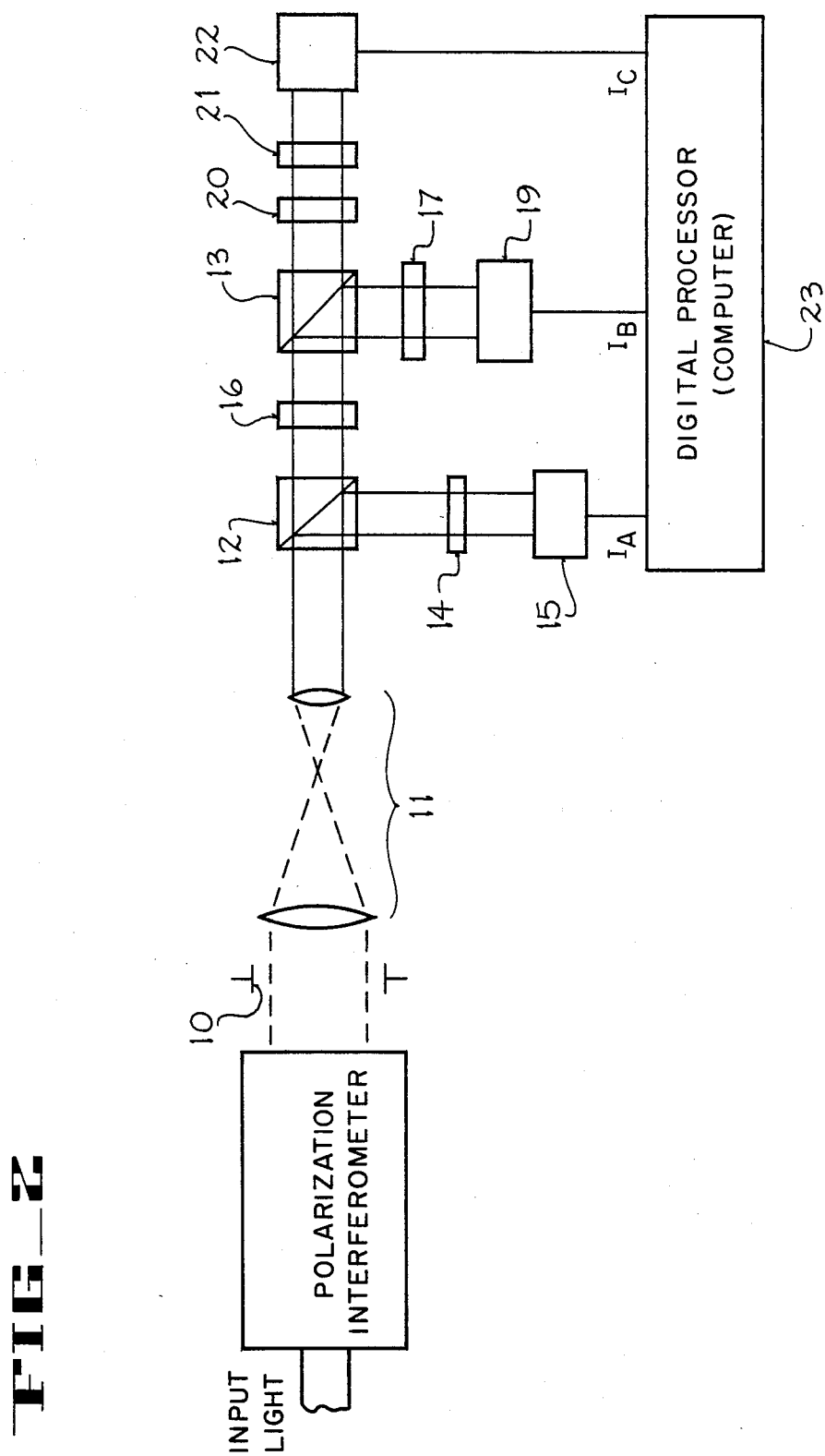
FIG_2

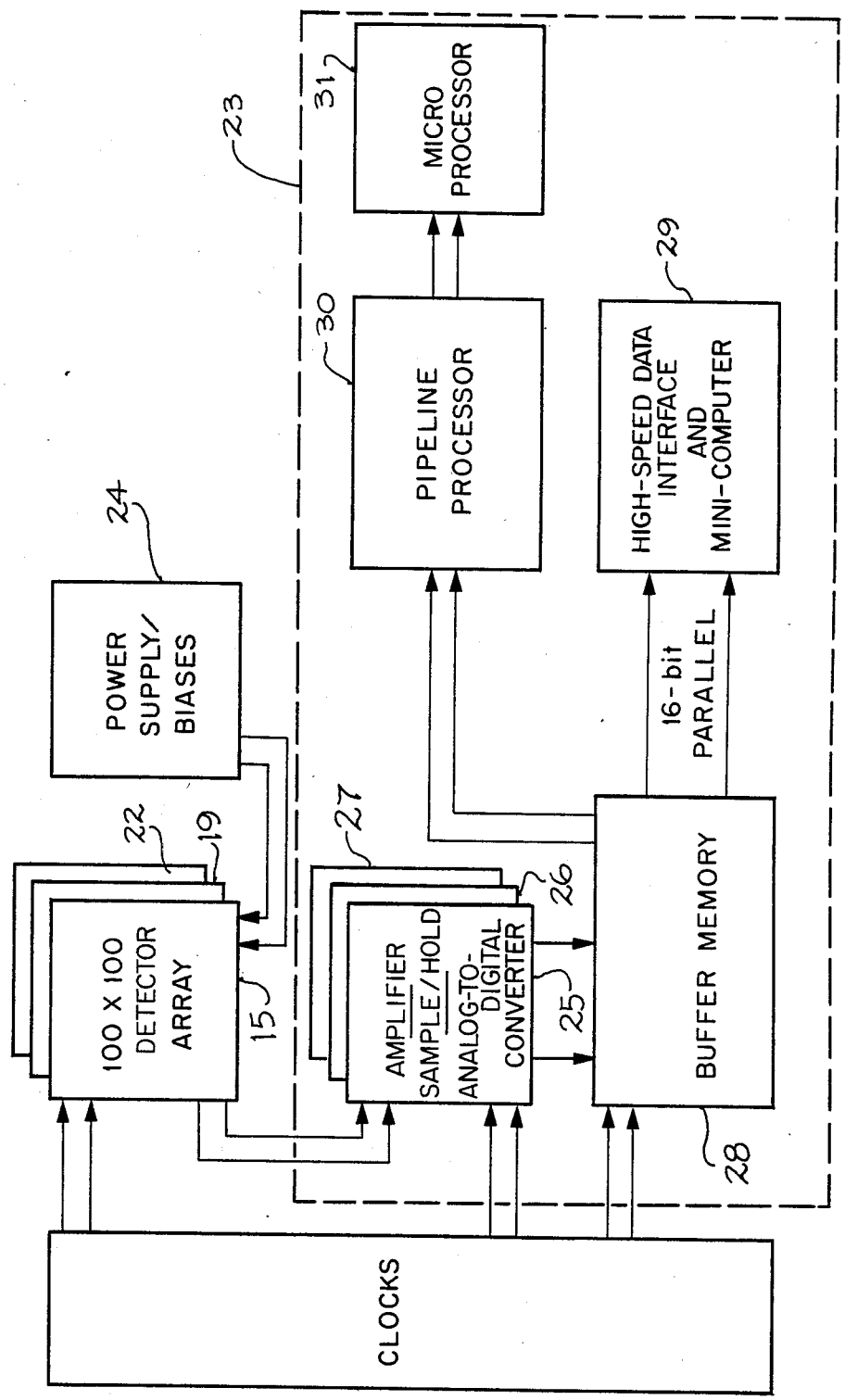

OPTICAL PHASE MEASURING APPARATUS

TECHNICAL FIELD

This invention relates generally to techniques for electronically measuring phase difference between interfering beams, and more particularly to a polarization interferometric technique for measuring the phase difference between pulses of coherent beams of optical radiation.

BACKGROUND OF THE INVENTION

An interference pattern is produced when two coherent beams of radiation, both of which may be derived from a common source, travel through different paths to a surface at which the beams interfere with each other. The resulting interference pattern can be analyzed to measure parameters such as phase difference between the two interfering beams.

An interferometer is an instrument comprising components defining different paths for beams derived from a common radiation source, and a means for detecting the interference pattern produced at the surface where the beams interfere. Major causes of measurement error in analyzing interference patterns include instability of the radiation source, noise generated by the detector means, dynamic range limitations of the detector means, atmospheric turbulence, and systematic errors inherent in the interferometer.

Phase-shifting interferometers and heterodyne interferometers have been used in the prior art for measuring the phase difference between two interfering coherent beams. A phase-shifting interferometer introduces phase modulation into one of the interfering beams, and typically uses an electronic phase detection technique to determine the phase difference between the interfering beams. A major disadvantage of phase-shifting interferometry is that presently available phase modulation devices generally have limited bandwidth, and therefore cannot be used effectively in applications requiring analysis of short pulses of radiation.

A heterodyne interferometer introduces frequency modulation into one of the two interfering coherent beams, and typically also uses an electronic phase detection technique to determine the phase difference between the interfering beams. In general, the irradiance distribution I at the interference surface (x,y) of any interferometer can be expressed by the equation $$I(x,y) = I_0(x,y) + I_1(x,y) \cos[\phi(x,y)], \quad (1)$$

where $I_0$ is the unmodulated (DC) component of the irradiance, $I_1$ is the amplitude of the modulated (AC) component of the irradiance, and $\phi(x,y)$ is the spatial phase difference between the two interfering beams. In heterodyne interferometry, a temporal phase modulation $\phi(t)$ is introduced into one of the two interfering beams so as to produce a time-dependent irradiance expressed as $$I(x,y,t) = I_0(x,y) + I_1(x,y) \cos[\phi(x,y) + \phi(t)]. \quad (2)$$

The irradiance distribution I can be measured by, e.g., a two-dimensional array of photodetector elements positioned at the interference surface, and the spatial phase difference $\phi(x,y)$ can be extracted from the time-varying signal $[\phi(x,y) + \phi(t)]$. The speed with which a heterodyne interferometer can resolve the spatial phase difference $\phi(x,y)$ depends upon the bandwidth of the temporal phase modulation $\phi(t)$.

SUMMARY OF THE INVENTION

In accordance with the present invention, three or more beams derived from a common source of optical radiation are directed along a corresponding three or more different channels, and a specified static phase difference is introduced between the beams in successive channels. Irradiance distributions of the resulting interference patterns produced at corresponding interference planes in the different channels are converted to electronic inputs to a data processing system, which calculates the spatially-varying phase difference between the beams in successive channels.

A three-channel interferometer for measuring the spatial phase difference between interfering coherent optical beams can be constructed using two non-polarizing beam splitters to define three channels for the output of a conventional polarization interferometer, and by positioning polarizing and retardation elements in the channels as appropriate to obtain the specified static temporal phase difference (e.g., $\pi/2$) between the beams in successive channels.

The irradiance distributions $I_A$, $I_B$ and $I_C$ at the three corresponding interference planes A, B and C of a three-channel phase-measuring interferometer according to the present invention can be expressed by the following equations, where a static temporal phase difference of $\pi/2$ is specified for the beams in successive channels:

$$\left. \begin{array}{l} I_A = I_{A0} + I_{A1} \cos[\phi(x,y)] \\ I_B = I_{B0} + I_{B1} \cos[\phi(x,y) + \pi/2] \\ I_C = I_{C0} + I_{C1} \cos[\phi(x,y) + \pi] \end{array} \right\} \quad (3)$$

where $I_{A0}$ and $I_{A1}$ are the DC and AC irradiance components respectively at the interference surface A; where $I_{B0}$ and $I_{B1}$ are the DC and AC irradiance components, respectively, at the interference surface B; and where $I_{C0}$ and $I_{C1}$ are the DC and AC irradiance components, respectively, at the interference surface C. By appropriate selection of the transmission and reflection coefficients of the beam splitters defining the three beam channels, it is possible to design the interferometer so that, substantially, $I_{A0} = I_{B0} = I_{C0}$, and $I_{A1} = I_{B1} = I_{C1}$.

Solving equations (3) for the spatial phase modulation $\phi(x,y)$ yields $$\phi(x,y) = \tan^{-1}\left( \frac{I_C - I_B}{I_A - I_B} \right) + \frac{\pi}{4}. \quad (4)$$

The fixed phase $\pi/4$ has no significance in measuring phase difference, and hence can be ignored. An interferometer according to the present invention generates signals representing the irradiance distributions $I_A$, $I_B$ and $I_C$, which serve as inputs to the electronic processing system for calculating the spatial phase modulation $\phi(x,y)$ by the algorithm of equation (4) in substantially real time.

The technique described above for a three-channel interferometer can be extended to a four-channel interferometer in which irradiance distributions $I_A$, $I_B$, $I_C$ and $I_D$ are measured at corresponding interference planes A, B, C and D of the respective channels of the interferometer. The spatial phase modulation $\phi(x,y)$ is then determined from an algorithm expressed in terms of $I_A$, $I_B$, $I_C$ and $I_D$.

It is appropriate to note that the temporal phase modulation $\phi(t)$ of equation (2) need not be $\phi/2$. Thus, for example, in certain applications it could be useful to introduce a phase step of $2\pi/3$ between successive channels of a three-channel interferometer.

DESCRIPTION OF THE DRAWING

FIG. 1 is a perspective view of a three-channel polarization interferometer according to the present invention.

FIG. 2 is a schematic view of the three-channel polarization interferometer of FIG. 1 connected to a system for processing the irradiance distribution output signals of the interferometer.

FIG. 3 is a schematic view of the system indicated in FIG. 2 for processing the irradiance distribution output signals of the interferometer.

BEST MODE OF CARRYING OUT THE INVENTION

In FIG. 1, the output of a polarization interferometer (e.g., a conventional polarized Twyman-Green interferometer) is shown passing from left to right through an entrance pupil defined by an aperture stop 10, and thence through an afocal telescope 11 to a first non-polarizing beam splitter 12. The output of the interferometer consists of a signal beam superimposed upon a reference beam, each of which is coherent and collinear with respect to the other, and both of which are of orthogonal polarization. In principle, the signal and reference beams may be either linearly orthogonally polarized or circularly orthogonally polarized. For the embodiment of the invention shown in FIG. 1, linear orthogonal polarization is assumed.

The afocal telescope 11 reimages the pupil of the aperture stop 10 onto detectors positioned at three different interference planes in three corresponding channels defined by the first beam splitter 12 and a second non-polarizing beam splitter 13. The first beam splitter 12 has a ratio of reflectance to transmittance of approximately 2:1. In practice, a commercially available non-polarizing cube beam splitter with a 30% transmittance may be used for the first beam splitter 12. The portion of the interferometer output transmitted by the first beam splitter 12 constitutes beam A, which passes through a polarizer 14 to a detector 15 at which an image of the entrance pupil is formed with an irradiance distribution $I_A$. The polarizer 14 is oriented with its axis at an angle of 45° to the orthogonal polarization states of the components of the signal and reference beams constituting beam A, so that these components comprising beam A mix and thus interfere with each other at the detector 15.

The portion of the interferometer output reflected by the first beam splitter 12 is transmitted through a quarter-wave retardation plate 16 to the second beam splitter 13, which has a ratio of reflectance to transmittance of approximately 1:1. In practice, a commercially available non-polarizing cube beam splitter with a 50% transmittance may be used for the second beam splitter 13. The portion of the interferometer output transmitted by the second beam splitter 13 constitutes beam B, and the portion of the interferometer output reflected by the second beam splitter 13 constitutes beam C. The quarter-wave retardation plate 16 is oriented so as to produce a $\rho/2$ phase difference between the polarization states of the components of the signal and reference beams constituting beam B, and to produce the same $\pi/2$ phase difference between the polarization states of the signal and reference beams constituting beam C.

Beam B passes from the second beam splitter 13 through a polarizer 17 to a turn mirror 18, from which beam B is reflected to a detector 17 at which an image of the entrance pupil is formed with an irradiance distribution $I_B$. The polarizer 17 functions with respect to beam B in the same way that the polarizer 14 functions with respect to beam A. Thus, the polarizer 17 causes the components of the signal and reference beams constituting beam B to mix, and thus to interfere with each other at the detector 19. The turn mirror 18 provides that the image formed at the detector 19 has the same parity (i.e., right- and left-handedness) as the image formed at the detector 15.

Beam C passes from the second beam splitter 13 through a quarter-wave retardation plate 20, and thence through a polarizer 21 to a detector 22 at which an image of the entrance pupil is formed with an irradiance distribution $I_C$. The quarter-wave retardation plate 20 functions with respect to beam C in the same way that the quarter-wave retardation plate 16 functions with respect to beam B. Thus, the quarter-wave retardation plate 20 produces a further $\pi/2$ phase difference between the polarization states of the component of the signal and reference beams constituting beam C in addition to the $\pi/2$ phase difference produced by the quarter-wave retardation plate 16. The net effect of both quarter-wave retardation plates 16 and 20 is to produce a $\pi$ phase difference between the polarization states of the signal and reference beams constituting beam C. The polarizer 21 causes the components of the signal and reference beams constituting beam C to mix, and thus to interfere with each other at the detector 22.

The arrangement of optical elements as illustrated in FIG. 1 is shown schematically in FIG. 2, in which the outputs from the detectors 15, 19 and 22 serve as inputs to a digital processor 23. A schematic illustration of a preferred embodiment of the digital processor 23 is shown in FIG. 3, in which the detectors 15, 19 and 22 are shown as conventional photodiode arrays of 100×100 elements each. The detectors 15, 19 and 22 are powered by conventional power supplies and appropriate biasing circuitry 24.

The time-varying irradiance distributions $I_A$, $I_B$ and $I_C$ at the detectors 15, 19 and 22, respectively, are read simultaneously, amplified and digitized by corresponding circuitry 25, 26 and 27. The digitized irradiance distribution signals thus obtained are then stored in a buffer-memory 28. In the embodiment shown in FIG. 3, the digitized irradiation distribution signals can be transferred by a 16-bit parallel input cable to a high-speed data interface and minicomputer 29 for performing signal processing functions (e.g., averaging) and display functions.

The digitized irradiance distribution signals are also processed in parallel by a special-purpose pipeline processor 30, which performs the algorithm of equation (4) to provide data regarding the spatial phase modulation $\phi(x,y)$, i.e., the phase difference between the signal beam and the reference beam. Phase data obtained from the pipeline processor 30 can be transferred through a microprocessor 31 to a display device and/or a data storage system.

A particular embodiment of a phase-measuring interferometer according to the present invention has been described herein. However, different embodiments suitable for particular applications would become apparent to workers skilled in the art upon perusal of the foregoing specification and accompanying drawing. For example, the second beam splitter 13 could be replaced by a polarizing beam splitter to increase the light efficiency of the interferometer. In other embodiments, circular polarization techniques could be used, or the phase difference between the beams in successive channels could be other than $\pi/2$. For particular applications, the output from the interferometer could be divided into more than three channels.

The description presented herein is to be understood as illustrative of the invention. The invention is defined by the following claims and their equivalents.

I claim:

1. An apparatus for measuring spatial distribution of phase difference between a signal beam and a reference beam in substantially real time, said signal and reference beams being coherent optical beams superimposed upon each other and having orthogonal polarization states with respect to each other, said apparatus comprising:
   (a) means for splitting said signal and reference beams into at least three channels so that corresponding components of said signal and reference beams are propagated in each channel, the components of said signal and reference beams in each channel being orthogonally polarized to each other;
   (b) means for adding a constant phase difference between the components of said signal and reference beams in each channel;
   (c) means for causing interference of the components of said signal and reference beams of different phase at a corresponding interference surface in each channel;
   (d) means for detecting an irradiance distribution of the interference of the components of said signal and reference beams of different phase at the interference surface in each channel, and for generating an electronic signal indicative of said irradiance distribution at the interference surface in each channel; and
   (e) means for processing electronic signals indicative of the corresponding irradiance distributions at the interference surfaces in all of said channels, and for performing an algorithm for measuring the spatial distribution of phase difference between said superimposed signal and reference beams in substantially real time from said electronic signals.

2. The apparatus of claim 1 wherein said means for splitting said signal and reference beams comprises:
   (a) a first non-polarizing beam splitter for dividing said signal and reference beams into transmitted components propagated in a first channel, and into reflected components; and
   (b) a second non-polarizing beam splitter for dividing the components of said signal and reference beams reflected by said first non-polarizing beam splitter into transmitted components propagated in a second channel, and into reflected components propagated in a third channel.

3. The apparatus of claim 2 wherein said means for adding said constant phase difference between the components of said signal and reference beams in each channel comprises:

(a) first phase retardation means interposed between said first non-polarizing beam splitter and said second non-polarizing beam splitter; and
   (b) second phase retardation means positioned in said third channel.

4. The apparatus of claim 3 wherein said first phase retardation means comprises a first quarter-wave retardation plate, and said second phase retardation means comprises a second quarter-wave retardation plate.

5. The apparatus of claim 3 wherein said means for causing interference of the components of said signal and reference beams of different phase in each channel comprises:
   (a) a first polarizer positioned in said first channel;
   (b) a second polarizer positioned in said second channel; and
   (c) a third polarizer positioned in said third channel.

6. The apparatus of claim 5 wherein said first, second and third polarizers are linear polarizers oriented so as to cause the components of said signal and reference beams of different phase in said first, second and third channels, respectively, to mix and interfere with each other in each of said first, second and third channels.

7. The apparaus of claim 5 wherein said means for detecting said irradiance distribution and for generating said electronic signal indicative of said irradiance distribution at the interference surface in each channel comprises:
   (a) a first array of photodiodes positioned at the interference surface in said first channel;
   (b) a second array of photodiodes positioned at the interference surface in said second channel; and
   (c) a third array of photodiodes positioned at the interference surface in said third channel.

8. The apparatus of claim 7 wherein said first, second and third arrays of photodiodes are planar arrays.

9. The apparatus of claim 8 further comprising means for collimating said superimposed signal and reference beams and for imaging the interference surface in each channel onto the corresponding planar array of photodiodes in each channel.

10. The apparatus of claim 9 wherein said collimating and imaging means comprises an afocal telescope.

11. The apparatus of claim 9 further comprising a turn mirror interposed between said second polarizer and said second array of photodiodes in said second channel, said turn mirror being oriented so that the image of the interference surface in said second channel formed on said second array of photodiodes has identical parity as the images of the interference surfaces in said first and third channels formed on said first and third arrays, respectively, of photodiodes.

12. The apparatus of claim 1 comprising means for splitting said signal and reference beams into three channels, said means for processing electronic signals indicative of corresponding irradiance distributions at the interference surfaces in said three channels and for performing the algorithm for measuring the spatial distribution of phase difference between said signal and reference beams from said electronic signals comprises a processor for performing the algorithm $$\phi(x,y) = \tan^{-1}\left(\frac{I_C - I_B}{I_A - I_B}\right)$$

where $\phi(x,y)$ is said spatial phase difference, $I_A$ is the irradiance distribution of the interference of the components of said signal and reference beams at the interference surface in a first channel, $I_B$ is the irradiance distribution of the interference of the components of said signal and reference beams at the interference surface in a second channel, and $I_C$ is the irradiance distribution of the interference of the components of said signal and reference beams at the interference surface in a third channel.

* * * * *